United States Patent
Mansfield

(10) Patent No.: US 11,231,071 B2
(45) Date of Patent: Jan. 25, 2022

(54) SELF-LUBRICATING CONDUCTIVE BEARING

(71) Applicant: SAFRAN LANDING SYSTEMS UK LTD, Gloucester (GB)

(72) Inventor: Ricky Peter Mansfield, Gloucester (GB)

(73) Assignee: Safran Landing Systems UK LTD

( * ) Notice: Subject to any disclaimer, the term of this patent is extended or adjusted under 35 U.S.C. 154(b) by 0 days.

(21) Appl. No.: 16/898,873

(22) Filed: Jun. 11, 2020

(65) Prior Publication Data

US 2020/0392991 A1 Dec. 17, 2020

(30) Foreign Application Priority Data

Jun. 14, 2019 (EP) .................................. 19180234

(51) Int. Cl.
*F16C 33/10* (2006.01)
*F16C 27/02* (2006.01)
(Continued)

(52) U.S. Cl.
CPC ............ *F16C 33/102* (2013.01); *F16C 11/04* (2013.01); *F16C 27/02* (2013.01); *F16C 33/201* (2013.01); *B64C 25/02* (2013.01); *F16C 2208/04* (2013.01); *F16C 2208/32* (2013.01); *F16C 2208/82* (2013.01); *F16C 2326/43* (2013.01)

(58) Field of Classification Search
CPC .......... F16C 11/04; F16C 17/26; F16C 27/27; F16C 33/10; F16C 33/01–02; F16C 2208/04; F16C 2208/32; F16C 2208/82; F16C 2226/12; F16C 2326/43;
(Continued)

(56) References Cited

U.S. PATENT DOCUMENTS 6,783,406 B2 * 8/2004 Keiser ................. H01R 4/4881
439/827
8,984,817 B2 * 3/2015 Weiden ................ F16C 33/201
52/173.3
(Continued)

FOREIGN PATENT DOCUMENTS

CN 104179774 A * 12/2014 ............. B64D 45/02
CN 107269655 A * 10/2017 ............. B64D 45/02
(Continued)

OTHER PUBLICATIONS

Extended European Search Report for European Application No. 19 180 234.7, dated Nov. 18, 2019, 8 pages.

*Primary Examiner* — Marcus Charles
(74) *Attorney, Agent, or Firm* — RatnerPrestia

(57) ABSTRACT

A bearing having an electrically conductive sleeve and a self-lubricating liner wherein the electrically conductive sleeve comprises a first portion and a second portion, the first portion and the second portion having respectively an inner surface and an outer surface; the self-lubricating liner extends over the inner surface of the first portion of the electrically conductive sleeve to define a first tubular volume, the first tubular volume having a first diameter and a first longitudinal axis; and the inner surface of the second portion of the electrically conductive sleeve defines a second tubular volume, the second tubular volume having the same diameter and the same longitudinal axis as the first tubular volume.

8 Claims, 4 Drawing Sheets

(51) Int. Cl.
*F16C 11/04* (2006.01)
*F16C 33/20* (2006.01)
*B64C 25/02* (2006.01)

(58) Field of Classification Search
CPC ...... F16C 33/102; F16C 27/02; F16C 33/201; B44C 25/02
USPC ........ 384/213, 219–220, 276, 282, 372, 322
See application file for complete search history.

(56) References Cited

U.S. PATENT DOCUMENTS

| | | | |
|---|---|---|---|
| 9,562,556 B2 * | 2/2017 | Haylock | F16B 4/004 |
| 2005/0175266 A1 * | 8/2005 | Noack | F16C 23/04 |
| | | | 384/277 |
| 2009/0180720 A1 * | 7/2009 | Weiden | F16C 11/02 |
| | | | 384/276 |
| 2012/0240350 A1 * | 9/2012 | Natu | B62K 21/06 |
| | | | 16/2.2 |
| 2013/0111742 A1 * | 5/2013 | Nguyen | F16B 33/00 |
| | | | 29/825 |
| 2014/0044385 A1 * | 2/2014 | Andelkovski | F16C 33/208 |
| | | | 384/276 |
| 2015/0200517 A1 * | 7/2015 | Nguyen | H01R 43/002 |
| | | | 29/842 |
| 2019/0093401 A1 * | 3/2019 | Hoenig | F16C 11/12 |

FOREIGN PATENT DOCUMENTS

| | | | | |
|---|---|---|---|---|
| DE | 19960736 C1 * | 7/2001 | ......... | E05D 11/0081 |
| EP | 3069991 A1 * | 9/2016 | ............ | B64C 25/20 |
| EP | 3228539 A1 * | 10/2017 | ............ | B64C 25/34 |
| EP | 3375709 A1 * | 9/2018 | ............ | B64C 25/34 |
| EP | 3498600 A1 * | 6/2019 | ............ | B64C 25/22 |
| GB | 2410986 A | 8/2005 | | |

* cited by examiner

SELF-LUBRICATING CONDUCTIVE BEARING

This application claims priority to European Patent Application No. EP 19180234.7, filed Jun. 14, 2019, which is incorporated herein by reference.

BACKGROUND

An aircraft landing gear assembly can include structural components movably coupled via a coupling or joint. For example, a forward stay includes first and second components that are pivotally coupled to each other using a pin joint to allow the stay to fold. The pin joint typically consists of a hard coated pin (traditionally chrome coated, and more latterly High-Velocity Oxygen Fuel (HVOF) coating) seated against a sacrificial wear bushing (typically made from aluminium bronze or stainless steel) that is housed within the mating lugs of the coupled components.

It is desirable for landing gears to provide a conductive path between the wheels and the landing gear attachment points on the aircraft to enable electrostatic discharges and to ensure protection against lighting strikes. In a pin joint, for example, the conductive path is formed by structural components electrically coupled using the conductive path between the metallic bushing and the joint pin.

Recently low-friction materials, commonly known as self-lubricating materials, have been used to line or coat joint bushes to reduce the need for periodical greasing of the joint. These self-lubricating materials are generally poor conductors and thus the electrical bonding that was ensured from metal to metal contact between the joint bush, the component and pin is lost.

Bonding straps are one way to provide a current path between coupled components. However, bonding straps require attachment points and fasteners and can cause snagging of other equipment. Furthermore bonding straps can cause excess noise and increase the complexity of the joint leading to a higher maintenance level. It would be desirable to mitigate these issues.

GB 2410986A describes an electrically conductive self-lubricating bearing system comprising a mating structure and an electrically conductive substrate wherein lubricating material 6 is disposed within valleys of the electrically conductive substrate so that that the lubricating material 6 lies flush with the uncoated and conductive parts.

SUMMARY OF THE INVENTION

According to a first aspect of the present invention there is provided a bearing comprising an electrically conductive sleeve and a self-lubricating liner wherein the electrically conductive sleeve comprises a first portion and a second portion, the first portion and the second portion having respectively an inner surface and an outer surface; the self-lubricating liner extends over the inner surface of the first portion of the electrically conductive sleeve to define a first tubular volume, the first tubular volume having a first diameter and a first longitudinal axis; and the inner surface of the second portion of the electrically conductive sleeve defines a second tubular volume, the second tubular volume having the same diameter and the same longitudinal axis as the first tubular volume.

Advantageously, a bearing according to the first aspect of the present invention provides a conductive path between the outer surface of the pin joint and the pin, electrically coupling the structural components that are movably coupled through the pin joint. Furthermore, a bearing according to the first aspect of the present invention reduces the need for lubrication grooves on the pin joint, and may reduce the space envelope and overall joint mass, leading to an improved pin joint.

The outer surface of the first portion of the electrically conductive sleeve may radially extend further from the first longitudinal axis than the outer surface of the second portion of the electrically conductive sleeve.

The second portion of the electrically conductive sleeve may comprise a plurality of contact sections protruding away from the first portion and in parallel to the first longitudinal axis, the contact sections being separated from one another by gaps formed in the second portion of the electrically conductive sleeve.

The bearing may comprise a flange. The flange may comprises a flange body radially extending from one end of the conductive sleeve.

According to a further aspect of the present invention there is provided a pin joint assembly comprising a joint pin; a component; and a bearing according to the above aspect, wherein the joint pin occupies the first and second tubular volumes and the outer surface of the first portion contacts the component such that the component is pivotally coupled to the joint pin.

The outer surface of the second portion of the electrically conductive sleeve may be separated by a gap from the component.

According to a further aspect of the present invention there is provided an aircraft landing gear assembly comprising one or more of the above joint assemblies.

BRIEF DESCRIPTION OF THE DRAWINGS

Some embodiments of the present invention will now be described, by way of illustrative example only, with reference to the accompanying Figures, of which.

DETAILED DESCRIPTION OF ILLUSTRATIVE EMBODIMENTS

Figure 1:
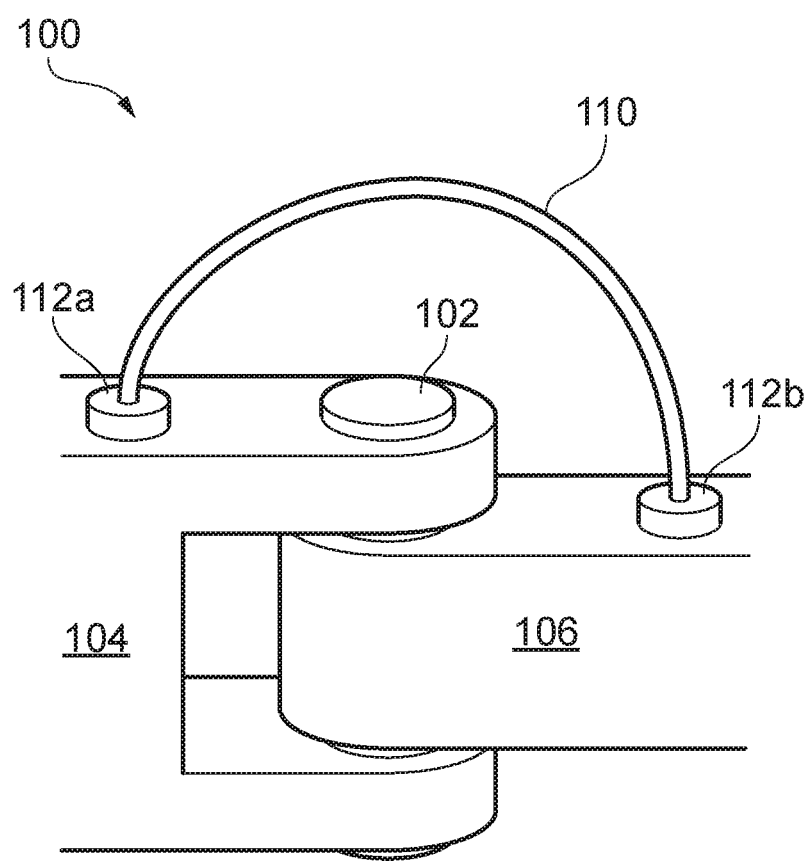
FIG. 1 is a known joint assembly comprising a bonding strap.

FIG. 1 shows a known pin joint 100 which comprises a joint pin 102 and a number of self-lubricating bearings. The pin joint 100 couples a first component 104 and a second component 106 such that the first component 104 can move relative to the second component 106 by pivoting about joint pin 102. The first component 104 and the second component 106 can for example be links of a side stay, torque links, lock links, bogie pivot pin, actuator attachments or other similar components commonly found in landing gears. Self-lubricating bushes (not visible in FIG. 1) are disposed between the joint pin and the first and second components 104, 106. The self-lubricating bushes comprises a low-friction material which reduces or eliminates the need for periodical lubrication of the bush. In other arrangements of known pin joints one of the first and second components may be cross-bolted to the joint pin, such that only the other component can move relative to the joint pin.

The low-friction material of the self-lubricating bush may be a poor electrical conductor. To ensure that a conductive path exists, through which electrostatic discharges or currents resulting from lighting strikes can flow from the first component 104 to the second component 106 an electrically conductive bonding strap 110 is coupled to the first component 104, through a first strap attachment point 112a, to the second component 106, through a second strap attachment point 112b. The bonding strap comprises an electrically conductive material. The attachment points 112a and 112b are configured to enable current to flow from the first component 104 through the bonding strap 110 to the second component 106.

Bonding straps suffer from a number of drawbacks. For example, they can cause snagging of other equipment or can cause the landing gear to 'hang up' during deployment. Furthermore, bonding straps can create excess noise and the attachment points 112a, 112b may require bolts and fasteners that can be detrimental to the structural integrity of the components 104, 106. Bonding straps also increase the complexity of the joint assembly and as a result require higher maintenance.

Figure 2:
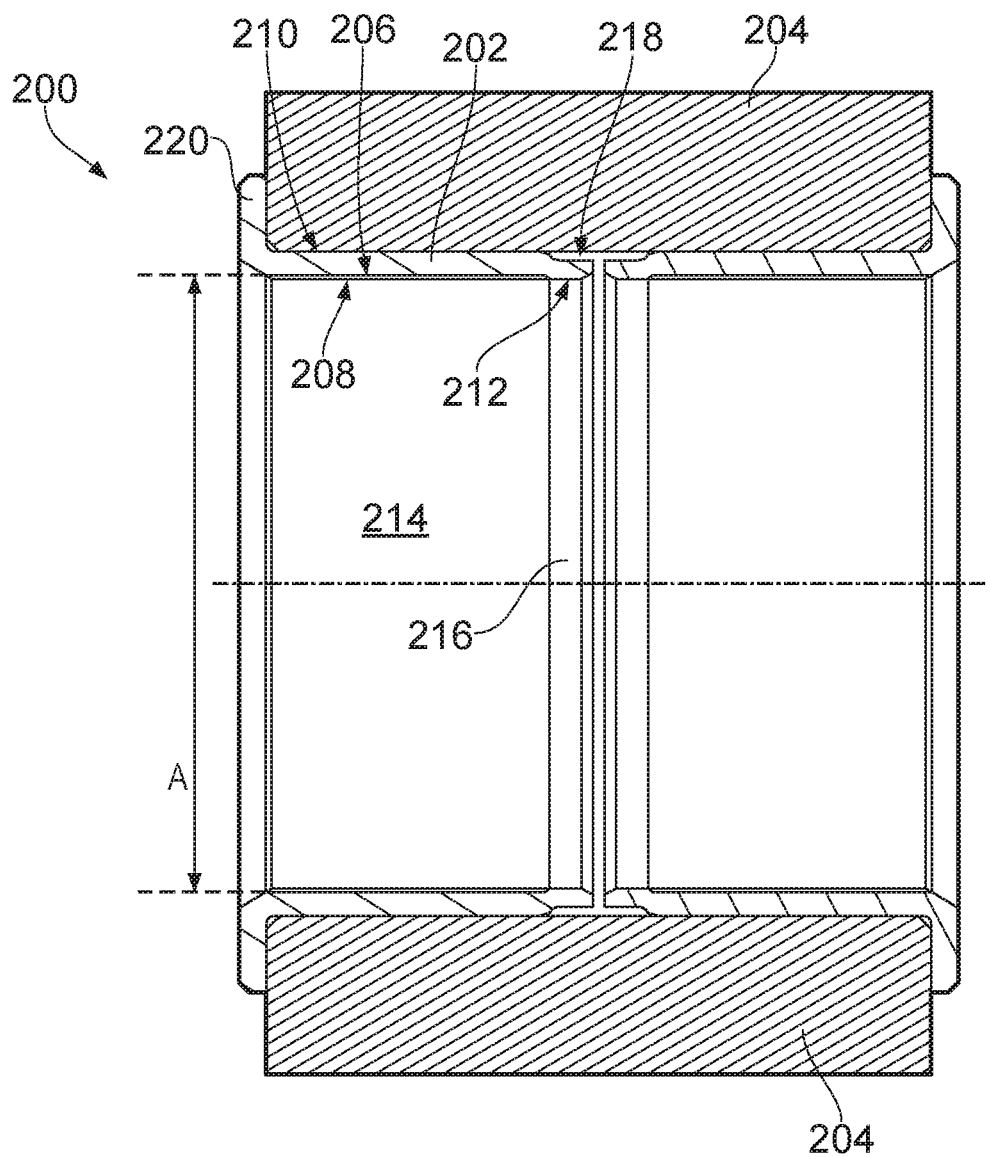
FIG. 2 is a cross-section diagram of a bearing according to an embodiment of the invention.

FIG. 2 shows a cross-section of a pin joint assembly comprising a bearing 200 according to an embodiment of the present invention. The bearing 200 is substantially tubular and comprises an electrically conductive sleeve 202 and a self-lubricating liner 208. The bearing 200 is arranged between the joint pin (not illustrated in FIG. 2) and an inner surface of the structural component 204, enabling the structural component 204 to pivot about the join pin while maintaining an electrical connection between the structural component 204 and the joint pin through the electrically conductive sleeve 202.

The electrically conductive sleeve 202 comprises a first portion and a second portion, the first and second portion being contiguous with each other. In this embodiment, the inner surface 206 of the first portion of the electrically conductive sleeve is tubular although in other embodiments it may not be tubular but have an uneven shape, to improve adherence of the liner 208 to the sleeve for example. The inner surface 206 of the first portion of the electrically conductive sleeve is lined or coated with a layer of self-lubricating material forming the self-lubricating liner 208 that defines a first tubular volume 214.

The self-lubricating liner 208 has an inner tubular surface arranged to contact the joint pin, facilitating the pivotal movement of the structural component 204 about the joint pin. The inner tubular surface of the self-lubricated liner 208 has a first diameter A.

In this embodiment, the outer surface 210 of the first portion of the electrically conductive sleeve is a tubular surface, arranged to contact and conform to a surface of the structural component 204. In other embodiments, the outer surface 210 may be shaped to define a rectangular right prism, a triangular right prism, or any other shape that conforms to the shape of the surface of the structural component 204.

The inner surface 212 of the second portion of the electrically conductive sleeve is tubular and defines a second tubular volume 216, the second tubular volume 216 having the same diameter A and the same longitudinal axis as the first tubular volume 214 defined by the inner surface of the self-lubricating liner 208. In the embodiment of FIG. 2, the second tubular volume 216 is contiguous to the first tubular volume, however in other embodiments the inner surface of the self-lubricated liner 208 and the inner surface 212 of the second portion of the electrically conductive sleeve may have a gap between them, resulting in a gap between the first and second tubular volumes 214, 216.

The bearing is arranged such that, when in use, the joint pin occupies the first and second tubular volumes 214, 216 and a current path exists from the outer surface 210 of the first portion of the electrically conductive sleeve to the inner surface 212 of the second portion of the electrically conductive sleeve, thus electrically coupling the structural component 204 to the joint pin.

Preferably, and as illustrated in FIG. 2, the outer surface 218 of the second portion of the electrically conductive sleeve does not contact the structural component 204, as the outer surface 210 of the first portion of the electrically conductive sleeve radially extends further from the longitudinal axis of the first and second tubular volumes 214, 216, than the outer surface of the second portion of the electrically conductive sleeve, thus creating an undercut relief opposite the inner surface 212 of the second portion. In other words, the second portion of the electrically conductive sleeve is shaped such that its inner surface contacts the joint pin, but its outer surface does not contact the structural component 204. The existence of the undercut relief, or recess, provides a small amount of flexibility, or resilience, to the second portion of the conductive sleeve 202 that, in use, is in contact with the joint pin. This flexibility is advantageous as it means that when in use the second portion of the conductive sleeve does not carry the full bearing load, as the second portion will elastically deform slightly such that the full bearing load is carried by the first portion of the conductive sleeve and the self-lubricating liner 208. By reducing the load carried by the second, unlined, portion of the sleeve undesirable wear and/or scoring of the conductive sleeve and joint pin is avoided. In other embodiments, the outer surface 218 of the second portion of the electrically conductive sleeve may be aligned with the outer surface 210 of the first portion of the electrically conductive sleeve.

In the embodiment of FIG. 2 the bearing comprises a flange 220 on one side. The flange 220 comprises a flange body radially extending from an end of the conductive sleeve and is arranged to limit the axial travel of the bearing 200 relative to the joint pin or the structural component 204. Other embodiments may not have a flange.

In FIG. 2 two bearings are illustrated, one being a mirror image of the other. Both bearings comprise a flange and an undercut relief opposite the non-lined inner surface of the electrically conductive sleeve. However, in other joint arrangements, there may be only one bearing, or only one bearing may have a flange, or only one bearing may have an undercut relief. In other arrangements, there may be one bearing as described above and the second bearing may lack the non-lined, second portion, i.e. the second bearing may have a self-lubricating liner extended over the whole of the inner surface of the electrically conductive sleeve. The skilled person will appreciate that various combinations of the above are possible.

Figure 3:
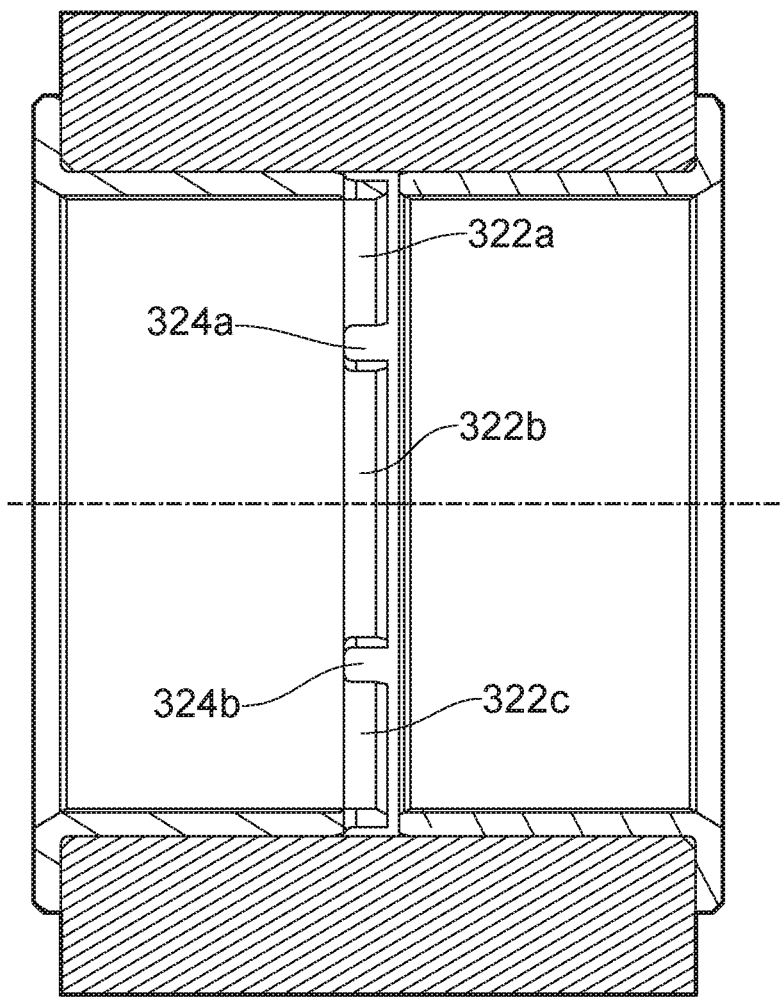
FIG. 3 is a cross-section diagram of a bearing according to another embodiment of the invention.

FIG. 3 shows another embodiment of the invention. The bearing of FIG. 3 is substantially similar to that of FIG. 2. However, in the embodiment of FIG. 3 the second portion of the electrically conductive sleeve has a castellated periphery, with a plurality of contact sections 322a, 322b, 322c protruding away from the first portion 202 of the electrically conductive sleeve and in parallel to the longitudinal axis of the first and second tubular volumes 214, 216. The contact sections 322a, 322b, 322c are separated from one another by gaps 324a, 324b, formed in the second portion of the electrically conductive sleeve. Although in the embodiment of FIG. 3 the members form rectangular castellations, in other embodiments, they may form a saw tooth pattern or any other similar shape. As such, in the embodiment of FIG. 3 the second portion of the electrically conductive sleeve forms a slotted ring, which provides enhanced flexibility of the second portion of the sleeve over that provided simply by the relief undercut.

Figure 4:
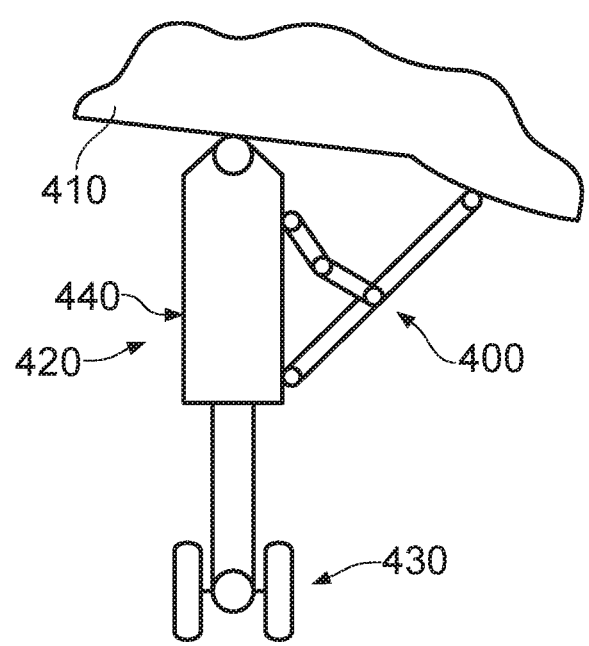
FIG. 4 is a diagram of a partial view of an aircraft with a landing gear assembly comprising an embodiment of the invention.

FIG. 4 shows a partial schematic of an aircraft 410 having a landing gear assembly 420 comprising a main landing strut 440, wheels 430, and at least one joint assembly 400 that includes a bearing in accordance with embodiments of the present invention.

The self-lubricating liner discussed previously can be a polymer reinforced with synthetic fibres that may comprise continuous fibres such as carbon, aramid, glass, PTFE, polyester, or a combination of them. The self-lubricating liner may also comprise epoxy containing particles of dry lubricant, such as graphite, and a continuously woven mix of PTFE fibres and carbon fibres. The skilled person will recognise that the above are just examples and that any material with low-friction properties may be used in their place. The self-lubricating liner may be injected on the inner surface 206 of the first portion of the electrically conductive sleeve.

The invention claimed is:

1. A bearing comprising:
    an electrically conductive sleeve comprising a first portion and a second portion, the first portion and the second portion each having a respective inner surface and a respective outer surface; and
    a self-lubricating liner extending over the inner surface of the first portion of the electrically conductive sleeve to define a first tubular volume, the first tubular volume having a first diameter and a first longitudinal axis;
    wherein the inner surface of the second portion of the electrically conductive sleeve defines a second tubular volume that, when the bearing is in use, has the same diameter and the same longitudinal axis as the first tubular volume; and
    wherein the outer surface of the first portion of the electrically conductive sleeve radially extends further from the first longitudinal axis than the outer surface of the second portion of the electrically conductive sleeve.

2. The bearing according to claim 1 wherein the second portion of the electrically conductive sleeve comprises a plurality of contact sections protruding away from the first portion and in parallel to the first longitudinal axis, the contact sections being separated from one another by gaps formed in the second portion of the electrically conductive sleeve.

3. The bearing according to claim 1, further comprising a flange.

4. The bearing according to claim 3, wherein the flange comprises a flange body radially extending from one end of the conductive sleeve.

5. The bearing according to claim 4, wherein the first portion of the electrically conductive sleeve is between the flange body and the second portion of the electrically conductive sleeve with respect to the first longitudinal axis.

6. A pin joint assembly comprising
    a bearing comprising:
        an electrically conductive sleeve comprising a first portion and a second portion, the first portion and the second portion each having a respective inner surface and a respective outer surface; and
        a self-lubricating liner extending over the inner surface of the first portion of the electrically conductive sleeve to define a first tubular volume, the first tubular volume having a first diameter and a first longitudinal axis;
        wherein the inner surface of the second portion of the electrically conductive sleeve defines a second tubular volume that, when the bearing is in use, has the same diameter and the same longitudinal axis as the first tubular volume; and
        wherein the outer surface of the first portion of the electrically conductive sleeve radially extends further from the first longitudinal axis than the outer surface of the second portion of the electrically conductive sleeve;
    a joint pin occupying the first and second tubular volumes; and
    a component in contact with the outer surface of the first portion of the electrically conductive sleeve such that the component is pivotally coupled to the joint pin.

7. The pin joint assembly according to claim 6, wherein the outer surface of the second portion of the electrically conductive sleeve is separated by a gap from the component.

8. An aircraft landing gear assembly comprising one or more joint assemblies according to claim 6.

* * * * *